US 6,584,561 B1

(12) United States Patent
Merkin et al.

(10) Patent No.: US 6,584,561 B1
(45) Date of Patent: Jun. 24, 2003

(54) SYSTEM AND METHOD TO MODIFY CD BOOT

(75) Inventors: Stanley L. Merkin, Georgetown, TX (US); Charles R. Dart, II, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 394 days.

(21) Appl. No.: 09/663,976

(22) Filed: Sep. 19, 2000

(51) Int. Cl.$^7$ .............................................. G06F 9/445
(52) U.S. Cl. ........................................................ 713/2
(58) Field of Search .............................................. 713/2

(56) References Cited

U.S. PATENT DOCUMENTS

| | | | |
|---|---|---|---|
| 5,099,516 A | 3/1992 | Durkin et al. ................. | 380/4 |
| 5,136,713 A | * 8/1992 | Bealkowski et al. ........... | 713/2 |
| 5,214,695 A | * 5/1993 | Arnold et al. ................. | 713/2 |
| 5,355,489 A | * 10/1994 | Bealkowski et al. ........... | 713/2 |
| 5,379,342 A | * 1/1995 | Arnold et al. ................. | 380/2 |
| 5,581,740 A | 12/1996 | Jones ........................ | 395/500 |
| 5,594,873 A | 1/1997 | Garrett ...................... | 395/281 |
| 5,745,568 A | 4/1998 | O'Connor et al. ............. | 380/4 |

OTHER PUBLICATIONS

Farzad Khosrowpour, *Original Equipment Manufacturer Identification for Configurable Electronic Hardware*, Filed Jan. 21, 1997, Ser. No. 08/786,007.

Jon Boede and Robert Tuttle, *Built–In Automatic Customer Identifier When Connecting to a Vendor Website*, Filed Oct. 29, 1998, Ser. No. 09/182,403.

David S. Springer, *System and Method for Identification and Streamlined Access to Online Services*, Filed Feb. 4, 1999, Ser. No. 09/244,473, U.S. Pat. No. 6,321,262.

Cynthia M. Merkin, *Computer Information Access Based on a Transmitted Identification Signal*, Filed Nov. 4, 1999, Ser. No. 09/434,770.

Farzad Khosrowpour, *Original Equipment Manufacturer Identification for Configurable Electronic Hardware (Drawings)*, Filed Jan. 21, 1997, Ser. No. 08/786,007.

Jon Boede and Robert Tuttle, *Built–In Automatic Customer Identifier When Connecting to a Vendor Website (Drawings)*, Filed Oct. 29, 1998, Ser. No. 09/182,403.

David S. Springer, *System and Method for Identification and Streamlined Access to Online Services (Drawings)*, Filed Feb. 4, 1999, Ser. No. 09/244,473.

Cynthia M. Merkin, *Computer Information Access Based on a Transmitted Identification Signal (Drawings)*, Filed Nov. 4, 1999, Ser. No. 09/434,770.

* cited by examiner

*Primary Examiner*—Thomas M. Heckler
(74) *Attorney, Agent, or Firm*—Haynes and Boone, LLP

(57) ABSTRACT

A system and method are presented for restricting a compact disk containing boot software to work only on computer systems for which the boot software has been authorized to operate. The disclosure allows the boot software to run on a particular computer system only if predetermined computer identification criteria are met. An advantage is that, by replacing the boot software stored on the computer system hardware, it provides the flexibility to produce new boot software when required by the introduction of a revised or new operating system. Another advantage is that the verification software's identification criteria can be tailored to the needs of the hardware and software vendors over the product life of the computer system hardware without requiring changes to the identification data stored in the computer system hardware.

21 Claims, 3 Drawing Sheets

SYSTEM AND METHOD TO MODIFY CD BOOT

BACKGROUND

This disclosure relates to the field of computer system manufacturing, packaging, and distribution processes. More specifically, this disclosure relates to a process for ensuring that a compact disk ("CD") containing boot software will work only with those computer systems for which the CD is manufactured and distributed.

DESCRIPTION OF THE RELATED ART

Computer systems in general and personal computer systems in particular have attained widespread use for providing computer power to many segments of today's modern society. A personal computer system can usually be defined as a desktop, floor standing, or portable microcomputer that includes a system unit having a system processor and associated volatile and non-volatile memory, a display monitor, a keyboard, one or more diskette devices, a fixed drive storage device, and an optional printer. One of the distinguishing characteristics of these systems is the use of a system board to connect these components together electronically. These personal computer systems are designed primarily to give independent computing power to a single user (or to a relatively small group of users in the case of personal computers that serve as computer server systems) and are inexpensively priced for purchase by individuals or small businesses. A personal computer system may also include one or more of a plurality of input and/or output ("I/O") devices (i.e., peripheral devices) that are coupled to the system processor and that perform specialized functions. Examples of peripheral devices include modems, sound and video devices, or specialized communication devices. Mass storage devices such as hard disks, compact disk drives, and magneto-optical drives are also considered to be peripheral devices.

CD media have become the media of choice for software distribution among software developers and hardware manufacturers. Software piracy and data security have been and continue to be problems arising with many types of media, including floppy disks. In contrast, CD media have, in the past, been somewhat immune from software piracy due to the read-only nature of the compact disk read only memory ("CD-ROM") medium favored for the distribution of software and difficulties arising from the expense of writing to CDs.

A challenge that remains, especially now that it has become technically feasible to write to CDs inexpensively, arises from the practice of shipping CD-ROMs containing particular software such as boot software with each computer system unit in a shipment of multiple units to a single customer. The customer may actually need only a small number (or even only one) of the many CD-ROMs shipped to them. The remaining unneeded CD-ROMs are subject to misuse with computer system units other than those with which they were shipped.

What is needed is a method and apparatus that protects against the use of software CD-ROMs with computer systems for which such use is not intended by the software manufacturer.

SUMMARY

The present disclosure relates to a method of checking a computer system for predetermined identification criteria and allowing the CD boot software to run on the computer system only if predetermined computer identification criteria are met. References throughout the CDs include all forms of CD, including CD-ROMs and writable CDs.

In a first embodiment, the computer system boot software on a CD ("CD boot disk") is treated as data rather than as executable software and is copied from the CD boot disk into the computer system's memory area along with identification verification software included on the CD. The verification software and the boot software from the CD are copied to the part of the computer system's memory area specified for the boot software to boot the computer system (the "execution part"). The verification software and the boot software from the CD are then copied to another part of the computer system's memory area (the "verification part"). The copy of verification software in the verification part is run to verify identification data previously stored in the computer system against the identification criteria in the verification software. If the computer system's identification data satisfies the verification software's criteria, the boot software is copied back to the execution part. The computer system then boots by executing this copy of the CD boot software. If the computer system's identification data does not satisfy the verification software's criteria, the boot software is not copied back to the execution part and the computer system displays an error message to the user.

In a second embodiment, the hardware unit manufacturer's verification software and the boot software are copied from the CD directly to the verification part for verification of the computer system's identification data. If the computer system's identification data satisfies the verification software's identification criteria, the boot software is copied from the verification part to the execution part for execution.

One advantage of the present disclosure is that, by replacing any boot software that may be stored in the computer system, it provides the flexibility to produce new boot software when required by the introduction of a revised or new operating system. Another advantage is that the verification software's criteria can be tailored to the needs of the hardware and software vendors over the product life of the computer system hardware without requiring changes to the identification data stored in the computer system.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

The following sets forth a detailed description of a mode for carrying out the embodiments. The description is intended to be illustrative of the invention and should not be taken to be limiting.

Figure 1:
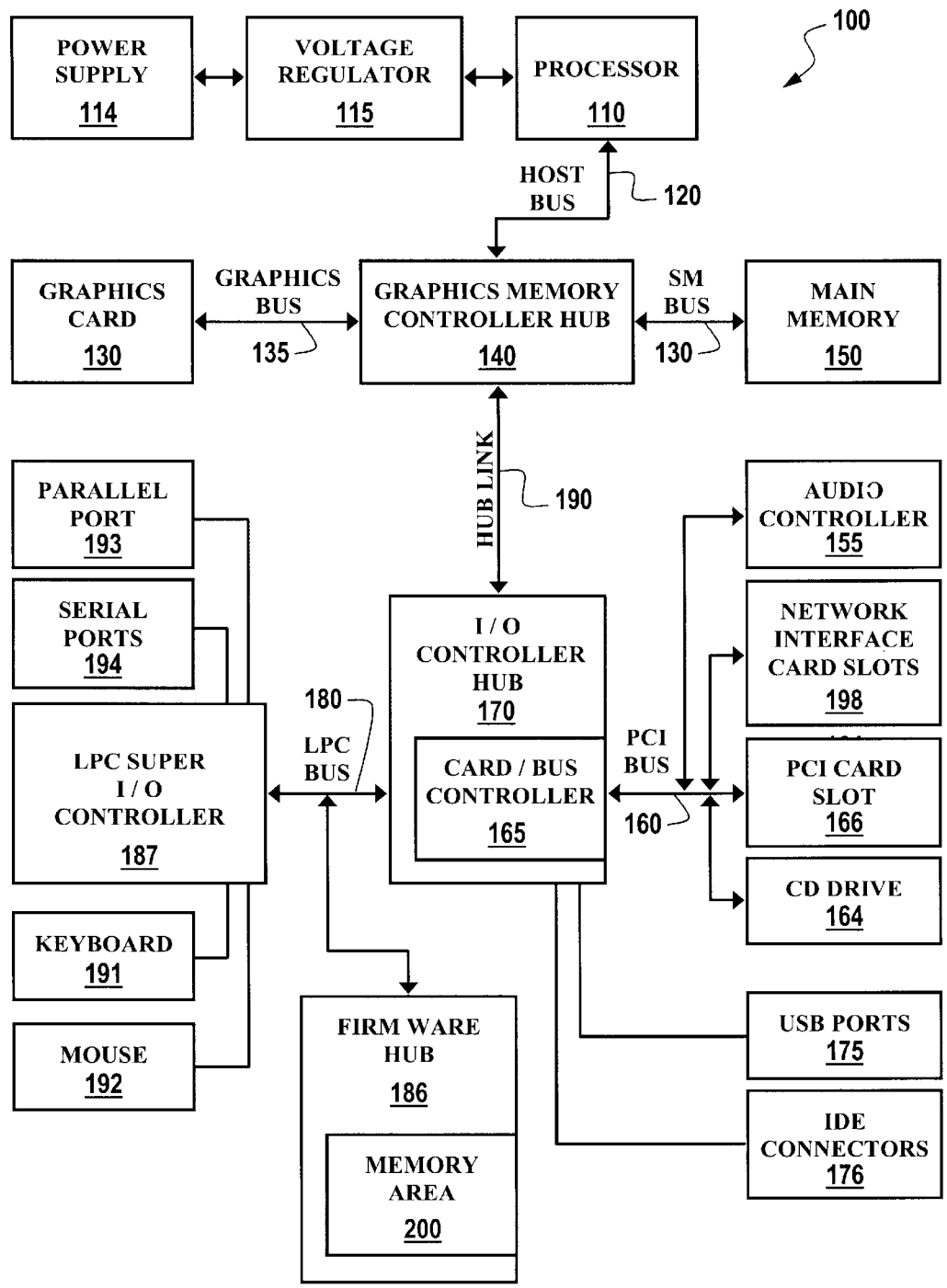
FIG. 1 is a block diagram of a first embodiment of present disclosure, showing many of the features of a typical computer system.

FIG. 1 is a block diagram of a first embodiment, an exemplary computer system 100 that may be found in many forms, including, for example, mainframes, minicomputers, workstations, servers, personal computers, internet terminals, notebooks, and embedded systems. Personal computer ("PC") systems, such as those compatible with the x86 configuration, include desktop, floor standing, or portable versions. Exemplary computer system 100 includes a computer system hardware unit that further includes a microprocessor (or simply "processor") 110, associated main memory 150, and a number of peripheral devices that provide I/O for the system 100, and computer system software that runs on the hardware unit. Exemplary computer system 100 is powered by a power supply 114 with voltage regulator 115. The peripheral devices often include keyboards 191, mouse-type input devices 192, and other traditional I/O devices (not shown) such as CD drive 164, and others not shown, including monitors, floppy and hard disk drives, modems, and printers. The number of I/O devices being added to personal computer systems continues to grow. For example, many computer systems also include terminal devices, televisions, sound devices, voice recognition devices, electronic pen devices, and mass storage devices such as tape drives or digital video disks ("DVDs"). The peripheral devices usually communicate with the processor over one or more peripheral component interconnect ("PCI") slots 166, universal serial bus ("USB") ports 175, or integrated device electronics ("IDE") connectors 176. The PCI slots 166 may use a card/bus controller 165 to connect to one or more buses such as host bus 120, PCI bus 160, and low pin count ("LPC") bus 180, with the buses communicating with each other through the use of one or more hubs such as graphics controller memory hub 140 and I/O controller hub 170. The USB ports 175 and IDE connectors 176 may connect to one or more of the hubs 140, 170. The hubs may communicate with each other through the use of one or more links such as hub link 190. Many I/O devices can also be accommodated by parallel ports 193 and serial ports 194 that are coupled to an I/O controller 187 that is in turn coupled to a LPC bus 180. Typical computer systems often include a graphics card 130 coupled to a graphics memory controller hub 140 by a graphics bus 135 and a main memory 150 coupled to a graphics memory controller hub 140 by a System Management ("SM") bus 130. Finally, a typical computer system also includes software modules known as the basic input/output system (BIOS) (not shown). The BIOS code is either copied from an external medium such as a CD to, or stored on, the memory area 200 in firmware hub 186.

In a first embodiment, a CD boot disk is loaded into CD drive 164. The verification software and the boot software are copied from the boot CD into the execution part 210 of memory area 200 as defined above. The verification software and the boot software is copied from the execution area 210 to verification part 220 of memory area 200 as defined above. A copy of the verification software is run to check the computer system's identification data against the verification software's identification criteria. If the computer system's identification data satisfies the verification criteria, the boot software is copied back to execution part 210 and the computer system boots using that copy of the boot software.

Figure 2A:
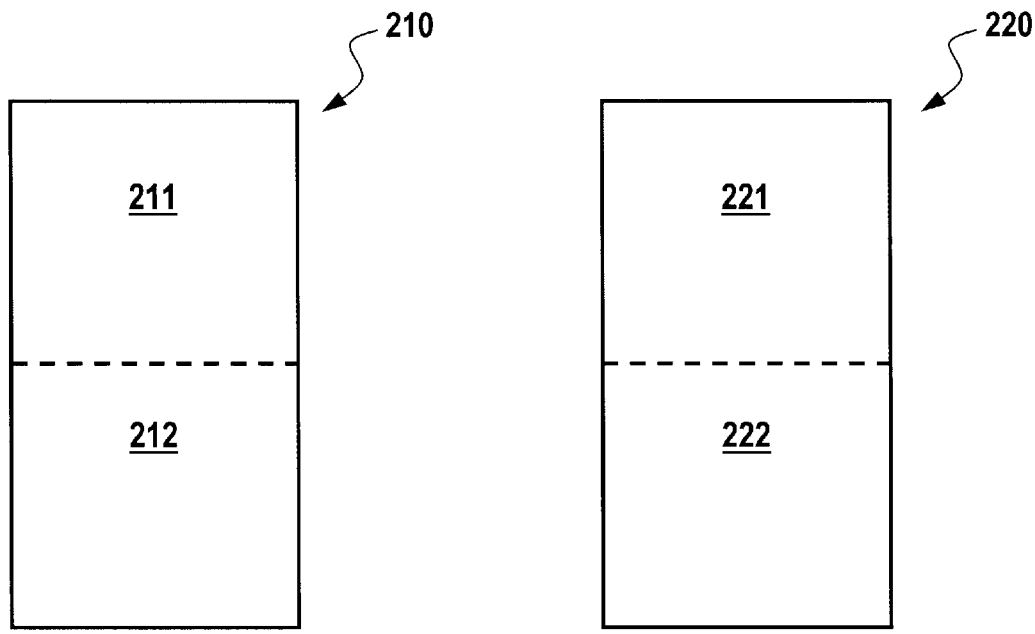
FIGS. 2A and 2B are functional block representations of two parts of a computer system hardware unit's memory area according to a first embodiment of the present disclosure.

FIG. 2A is functional block representation of two parts of a computer system hardware unit's memory area according to a first embodiment of the present disclosure. Part 210 is the part of the computer system hardware unit's memory area 200 to which the verification software and the boot software on the CD in the CD drive are copied when the CD is placed in the CD drive and the computer system is powered on. A copy of verification software 211 and a copy of boot software 212 are shown in the parts of the memory area 200 to which they are respectively copied within part 210. Part 220 is the part of memory area 200 to which the copy of verification software 211 and the copy of boot software 212 in part 210 are copied for verification of the computer system hardware's identification data. The copy of verification software 221 and the copy of boot software 222 are shown in the parts of the memory area 200 to which they are respectively copied within part 220.

Figure 2B:
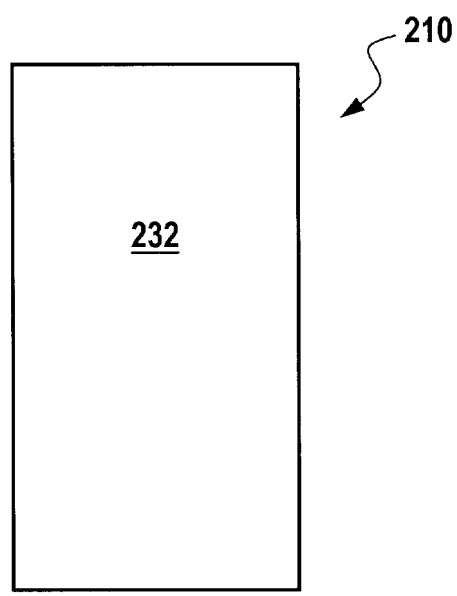

FIG. 2B is functional block representation of the part 210 of the memory area 200 according to a first embodiment of the present disclosure. If the verification software verifies the computer system hardware's identification data against the verification software's identification criteria, the copy of boot software 222 is copied to part 210 for execution to boot the computer system. That copy of the copy of boot software 222 is shown in FIG. 2B as the copy of boot software 232. In a first embodiment, if the verification software does not verify the computer system hardware's identification data against the verification software's identification criteria, copy of boot software 222 is not copied to part 210 for execution to boot the computer system, the boot software is not used to boot the computer system, and an error message is displayed to the user.

Figure 3:
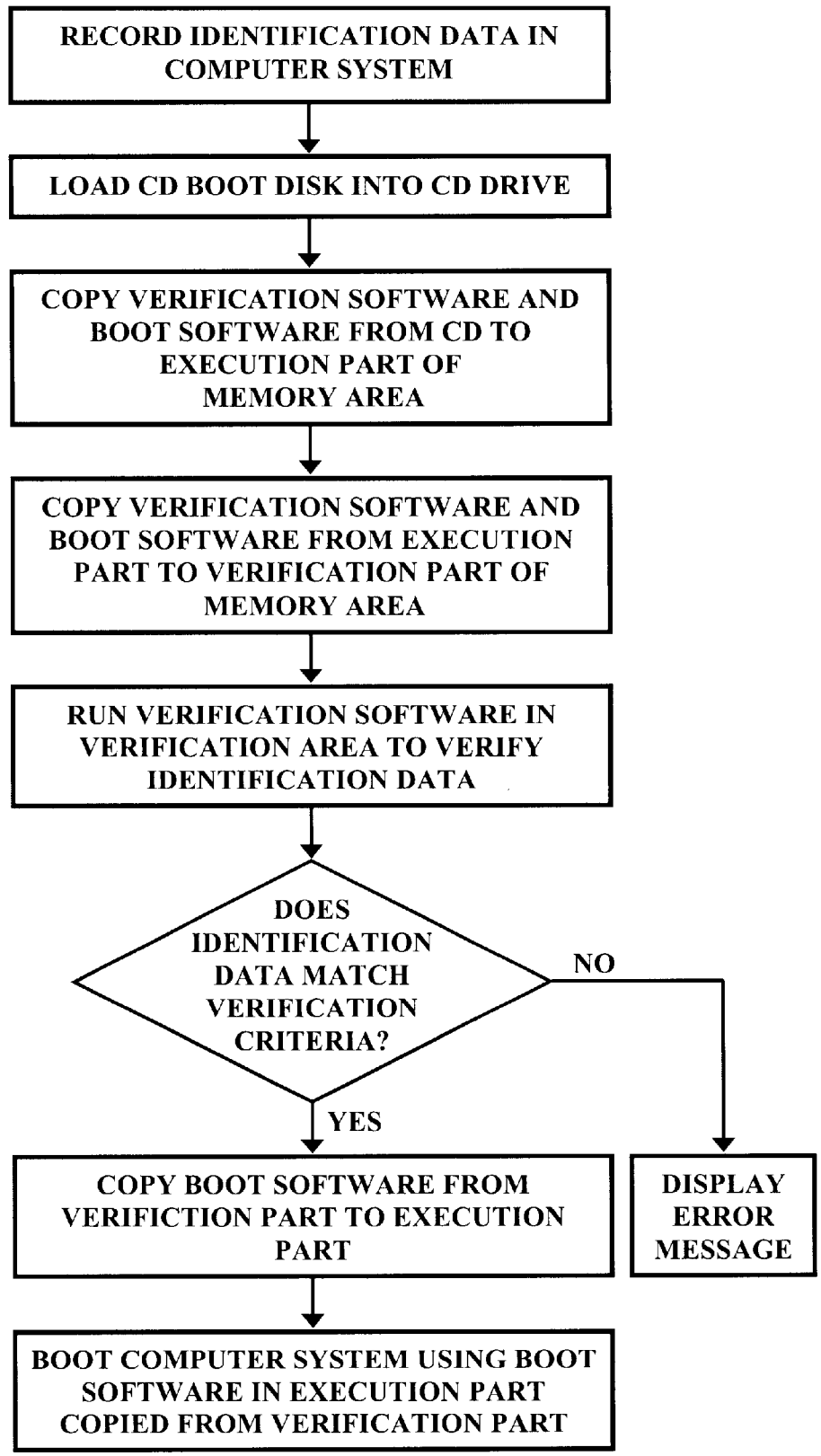
FIG. 3 is flow chart showing the steps of a first embodiment of the present disclosure.

FIG. 3 is a flow chart showing graphically the steps of a first embodiment of the present disclosure as described in detail in connection with FIGS. 2A and 2B above.

One skilled in the art will recognize that the foregoing components and devices are used as examples for the sake of conceptual clarity and that various configuration modifications are common. Consequently, as used herein the specific exemplars set forth in FIGS. 1, 2A, and 2B are intended to be representative of their more general classes. In general, use of any specific exemplar herein is also intended to be representative of its classes, and the non-inclusion of such specific devices in the foregoing list should not be taken as indicating that limitation is desired. For example, references to CDs include other memory devices such as DVDs and non-volatile memory devices that serve the same purpose, and references to CD drives include drives and other peripheral devices for the use of other memory devices such as DVDs and non-volatile memory devices that serve the same purpose.

What is claimed is:

1. A method for booting a computer system comprising:
    recording identification data identifying the computer system in the computer system;
    loading into a non-volatile memory device drive included in the computer system a non-volatile memory device including:
        verification software including software code to verify the identification data; and
        boot software including software code to boot the computer system;
    copying the verification software and the boot software to produce at least one copy of the verification software and at least one copy of the boot software in a memory area of the computer system;
    verifying the identification data using a copy of the verification software in the memory area; and
    booting the computer system using a copy of the boot software in the memory area if the identification data is verified by a copy of the verification software.

2. The method of claim 1 wherein:
    the copying includes:
        copying the verification software and the boot software to produce a first copy of the verification software and a first copy of the boot software in a first part of the memory area; and copying the first copy of the verification software and the first copy of the boot software to produce a second copy of the verification software and a second copy of the boot software in a second part of the memory area;

the verifying uses the second copy of the verification software; and the booting includes:

copying the second copy of the boot software to produce a third copy of the boot software in the first part of the memory area; and booting the computer system using the third copy of the boot software.

3. The method of claim 2 wherein the first part of the memory area is designated for execution of the boot software.

4. The method of claim 1 wherein the verifying includes comparing the identification data to verification criteria included in the verification software and in each copy of the verification software produced by copying the verification software.

5. The method of claim 4 wherein:

the identification data identifies the computer system as a member of a particular set of computer systems; and the verification software verification criteria are satisfied if the identification data identifies the computer system as being a member of the particular set of computer systems.

6. The method of claim 4 wherein:

the identification data uniquely identifies the computer system; and the verification software verification criteria are satisfied if the identification data identifies the computer system as being the uniquely identified computer system defined by the verification criteria.

7. The method of claim 1 wherein the non-volatile memory device is a compact disk and the non-volatile memory device drive is a compact disk drive.

8. A computer system comprising:

a processor;

a non-volatile memory device drive coupled to the processor;

identification data identifying the computer system coupled to the processor;

a non-volatile memory device including:

verification software including software code to verify the identification data; and boot software including software code to boot the computer system;

a memory coupled to the processor, the memory including:

means for copying the verification software and the boot software to produce at least one copy of the verification software and at least one copy of the boot software in the memory;

means for verifying the computer system identification data using a copy of the verification software in the memory; and means for booting the computer system using a copy of the boot software in the memory if the identification data is verified by a copy of the verification software.

9. The computer system of claim 8 wherein:

the means for copying includes:

means for copying the verification software and the boot software to produce a first copy of the verification software and a first copy of the boot software in a first part of the memory; and means for copying the first copy of the verification software and the first copy of the boot software to produce a second copy of the verification software and a second copy of the boot software in a second part of the memory;

the means for verifying uses the second copy of the verification software; and the means for booting includes:

means for copying the second copy of the boot software to produce a third copy of the boot software in the first part of the memory; and means for booting the computer system using the third copy of the boot software.

10. The computer system of claim 9 wherein the first part of the memory is designated for execution of the boot software.

11. The computer system of claim 8 wherein the means for verifying includes means for comparing the identification data to verification criteria included in the verification software and in each copy of the verification software produced by copying the verification software.

12. The computer system of claim 11 wherein:

the identification data identifies the computer system as a member of a particular set of computer systems; and the verification software verification criteria are satisfied if the identification data identifies the computer system as being a member of the particular set of computer systems.

13. The computer system of claim 11 wherein:

the identification data uniquely identifies the computer system; and the verification software verification criteria are satisfied if the identification data identifies the computer system as being the uniquely identified computer system defined by the verification criteria.

14. The computer system of claim 8 wherein the non-volatile memory device is a compact disk and the non-volatile memory device drive is a compact disk drive.

15. An apparatus comprising:

a memory;

a computer system coupled to the memory;

identification data identifying the computer system coupled to the memory;

a non-volatile memory device drive; and a non-volatile memory device including:

verification software including software code to verify the identification data; and boot software including software code to boot the computer system; the memory including:

means for copying the verification software and the boot software to produce at least one copy of the verification software and at least one copy of the boot software in the memory;

means for verifying the computer system identification data using a copy of the verification software in the memory; and means for booting the computer system using a copy of the boot software in the memory if the identification data is verified by a copy of the verification software.

16. The apparatus of claim 15 wherein:

the means for copying includes:
- means for copying the verification software and the boot software to produce a first copy of the verification software and a first copy of the boot software in a first part of the memory; and
- means for copying the first copy of the verification software and the first copy of the boot software to produce a second copy of the verification software and a second copy of the boot software in a second part of the memory;

the means for verifying uses the second copy of the verification software; and the means for booting includes:
- means for copying the second copy of the boot software to produce a third copy of the boot software in the first part of the memory; and
- means for booting the computer system using the third copy of the boot software.

17. The apparatus of claim 16 wherein the first part of the memory is designated for execution of the boot software.

18. The apparatus of claim 15 wherein the means for verifying includes means for comparing the identification data to verification criteria included in the verification software and in each copy of the verification software produced by copying the verification software.

19. The apparatus of claim 18 wherein:

the identification data identifies the computer system as a member of a particular set of computer systems; and the verification software verification criteria are satisfied if the identification data identifies the computer system as being a member of the particular set of computer systems.

20. The apparatus of claim 18 wherein:

the identification data uniquely identifies the computer system; and the verification software verification criteria are satisfied if the identification data identifies the computer system as being the uniquely identified computer system defined by the verification criteria.

21. The apparatus of claim 15 wherein the non-volatile memory device is a compact disk and the non-volatile memory device drive is a compact disk drive.

* * * * *